R. C. STEVENS.
PUPPET VALVE.
APPLICATION FILED JAN. 26, 1914.
1,112,233.   Patented Sept. 29, 1914.
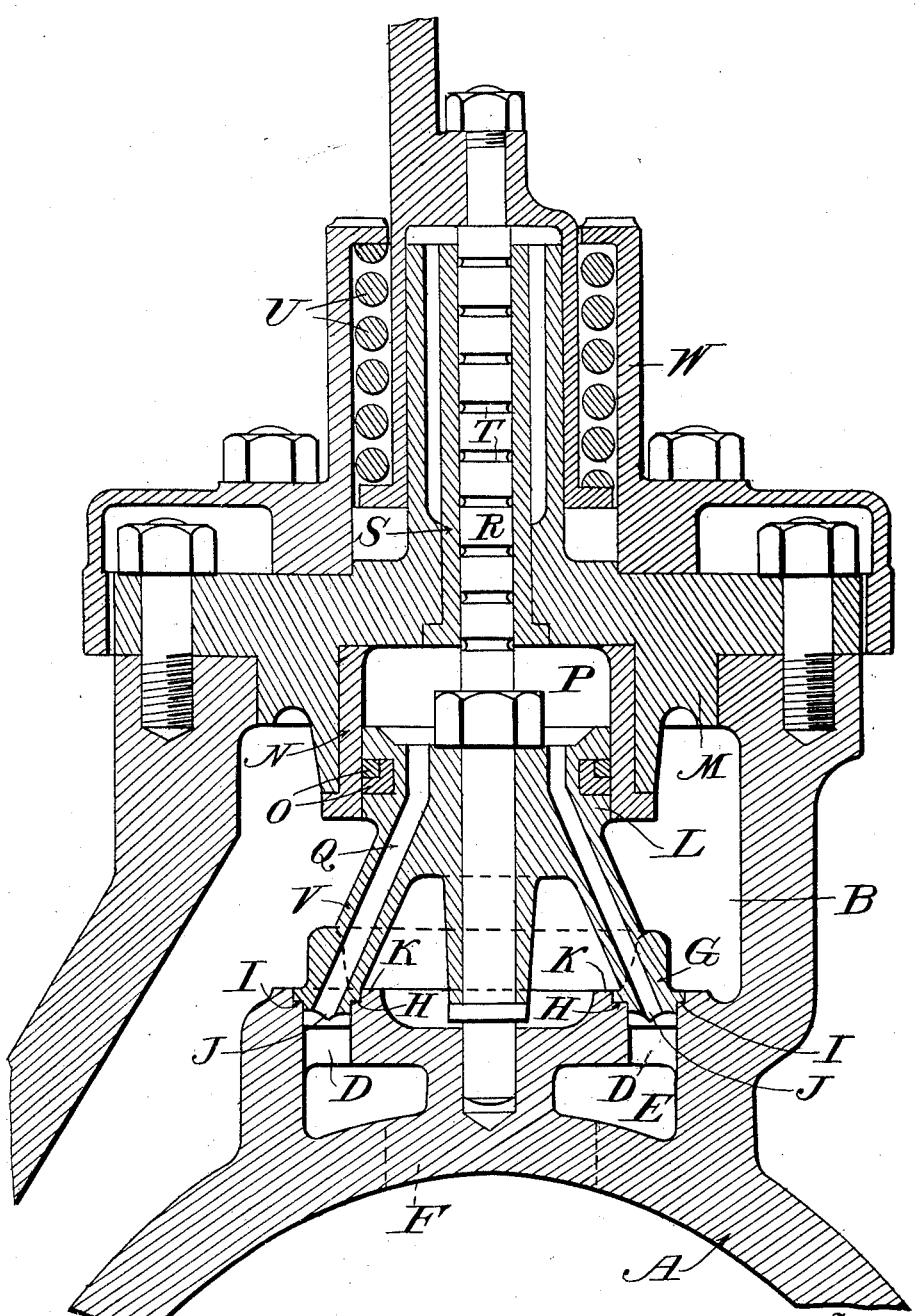

UNITED STATES PATENT OFFICE.

ROBERT C. STEVENS, OF ERIE, PENNSYLVANIA, ASSIGNOR TO THE SKINNER ENGINE COMPANY, OF ERIE, PENNSYLVANIA, A CORPORATION OF PENNSYLVANIA.

PUPPET-VALVE.

1,112,233.  Specification of Letters Patent.  Patented Sept. 29, 1914.

Application filed January 26, 1914. Serial No. 814,394.

*To all whom it may concern:*

Be it known that I, ROBERT C. STEVENS, a citizen of the United States, residing at Erie, in the county of Erie and State of Pennsylvania, have invented certain new and useful Improvements in Puppet-Valves, of which the following is a specification.

This invention relates to balanced puppet valves, particularly adapted and intended for use in steam engines.

A single-beat puppet valve ordinarily has a single seat, and is ordinarily unbalanced. In order that a puppet valve may be balanced, it has long been customary that the valve should be made double-beat, or with double seats; and such a valve is usually in practical balance. One difficulty, however, that has been encountered with such valves is that the valve expands differently from the seats, and it is therefore difficult to maintain both seats steam-tight. A double-beat valve, however, has the advantage over the single-beat valve that it requires only half as much lift as the single-beat valve to secure suitable steam opening.

The valve as shown on accompanying drawing accomplishes the same purpose as a double-beat valve, but is so designed that expansion or contraction, due to varying steam pressure or varying steam temperature, or differing co-efficients of expansion of metal, will not cause the valve to leak. Also, in view of the present modern use of high pressure steam and high rotative speed it is considered absolutely necessary for practical operation that puppet valves should be substantially balanced, and that their lift for quiet operation of cams should be small. With the present valve, it has only half of the lift of a single seated valve and is also capable of being balanced in any desired amount so as to be entirely adaptable to use with high pressure steam and high speeds, and it comprises a double seated valve with seats in the same plane, combined with a balancing piston having boiler pressure on one side and cylinder pressure on the other side when in closed position and being substantially balanced when in open position.

The valve, as will be hereinafter explained, is single-ported, but with double seats arranged in the same plane. The lift need not be greater than the lift of the usual double-beat puppet valve; yet the admission of the steam is in effect equivalent to the double-port arrangement.

In the accompanying drawing—Figure 1 is a longitudinal sectional view of the valve.

Referring to the drawings, A shows a cylinder barrel in cross section, B the steam chest; D an annular port communicating with the steam chest B, connected by the space E and the port F with the cylinder for the admission of steam.

G is an annular valve, having two annular faced surfaces H and I, these surfaces arranged in the same plane, and to contact with opposing annular surfaces on the valve seat in the cylinder casting. This seat may be made in a separate cage, if desired. In the construction as shown, the valve seat is arranged to give a cushioning effect, for a portion of the annular valve within the two annular seats projects within the annular port, and outside and inside of the respective annular seats the metal of the cylinder is raised so that the annular valve seats itself within this metal. In closing, therefore, the valve will momentarily cushion a small amount of steam on the annular surfaces, and in consequence the valve will seat quietly. The cushioned seat is not essential to the proper operation of this valve, for the projection J of the valve, and the projections K of the seat, may be removed, and the valve is still operative as a valve in practical balance, similar to the usual double beat puppet valve.

The annular valve G is preferably built in one with a piston L. This piston L works within a bonnet M, which bonnet may or may not have a cylinder bushing N. The piston L is preferably packed within the cylinder N by packing rings O as shown, though other type of packing, or annular grooves usually called "water packing", may be used. Above the piston L is a cylinder chamber P, which is in communication with the main cylinder A through the passages Q and the cylinder ports, said passages being cored in the spaced arms V connecting the piston and the ring G. There are many ways, however, of connecting the cylinder chamber P with the main cylinder A, the object merely being to maintain within the cylinder chamber P the same pressure as is maintained in the cylinder A and in the annular port D beneath the valve G.

Attached to the valve G is a valve stem R, operating preferably through a sleeve S, and provided preferably with water packing grooves T, this valve stem being operated by valve mechanism usually of the cam type, (not shown). It is customary also to use a spring U inclosed in a casing W, for the best operation of a puppet valve, though such a spring is not absolutely necessary.

The area of the cylinder P and of the valve stem R, and the strength of the spring U, are so proportioned with respect to the area of the annular port D and the areas of the annular seats H and I as to produce any desired approximation of balance, the usual custom being to slightly unbalance a puppet valve so that the pressure of the steam in the steam chest B shall maintain the valve closed when the valve is on its seat.

The double ported effect follows from the flow of steam under both edges of the valve when it is opened, whereby only slight lift is necessary, and the location of the attached piston at the lower end of the valve stem, and in proximity to the valve, is advantageous for its compactness and the lack of necessity for a high or large valve casing, as well as permitting the valve and piston to be made in one casting. By having two seats in the same plane the seats and valve can be readily machined and faced, each at a single operation, and the defects of the ordinary double seated puppet valve with seats in different planes, and incident to unequal expansion of the valve and seats, are avoided, the leaks incident to such expansion being prevented.

Having thus described my invention, what I claim as new is:

1. The combination of a valve casing having an annular port and two seats in the same plane, and a cylinder, an annular valve coöperating with said seats, and a balancing piston connected to said valve and working in the cylinder, and provided with a passage extending through the valve and piston and connecting the port and the chamber within the cylinder.

2. The combination of an annular puppet valve provided with two seating faces in the same plane, a valve seat having a single port controlled by said valve, a balancing piston connected to said valve, and a cylinder in which said piston works.

3. A combined puppet valve and balancing piston, the valve having two seats in the same plane, and provided with a steam passage extending through said valve and piston.

4. A combined annular puppet valve and balancing piston, the valve and piston being connected by spaced arms, and provided with a passage extending through the valve, piston and one of the arms, from the face of the valve to the opposite side of the piston.

5. The combination of a valve casing having an annular port and two seats around the same in the same plane, a cylinder opposite said port and open at one end into the valve casing, an annular puppet valve having two faces in the same plane, coöperating with said seats, a balancing piston in the cylinder, and connected to said valve, and means to equalize the pressure in said port and cylinder.

6. A combined puppet valve and balancing piston, comprising an integral casting having an annular ring at one end, a piston at the other end, and spaced arms connecting the ring and piston.

In testimony whereof, I affix my signature in presence of two witnesses.

ROBERT C. STEVENS.

Witnesses:
  OSCAR NERZ,
  ALBERT E. ROSE.